March 31, 1931. H. T. BROWN 1,798,782
PUMP
Filed Sept. 16, 1929
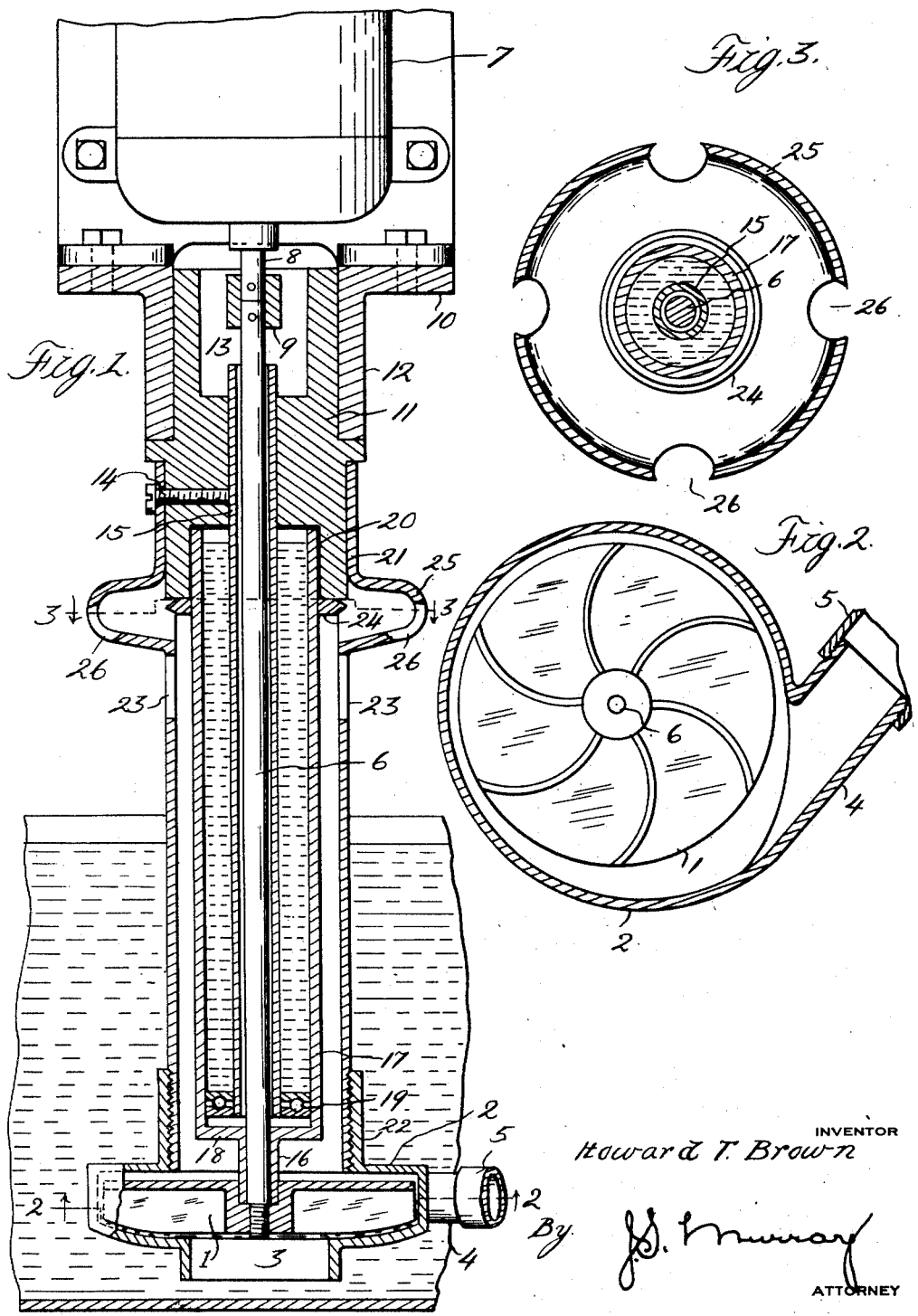

Patented Mar. 31, 1931

1,798,782

UNITED STATES PATENT OFFICE

HOWARD T. BROWN, OF DETROIT, MICHIGAN

PUMP

Application filed September 16, 1929. Serial No. 392,969.

This invention relates to pumps, and particularly to centrifugal pumps.

In pumping liquids and particularly in pumping coolants to grinding machines, it is highly desirable to prevent access of the liquid to the journal bearings of the pump shaft, since the liquid will tend to carry lubricant away from said bearings, causing the latter to run hot, and any grit or sediment that may be suspended in the liquid will subject the bearings to undue wear. The last mentioned effect is especially pronounced in the case of coolants delivered to and from grinding machines, since these usually carry in suspension considerable highly abrasive grit.

The majority of centrifugal pumps now in use employ packings to protect the journal bearings from the pumped liquid, and while the desired result may be thus attained, such packings require frequent renewal, and if not attended to at the proper time will permit serious damage to the pump shaft and its bearings.

It is an object of the present invention to provide a centrifugal pump having its drive shaft bearings and lubricant chambers well protected against access of the pumped liquid and achieving this result without recourse to packings.

Another object is to drive a centrifugal pump through a vertical shaft from a motor disposed some distance above said pump, to extend a tubular stationary support downwardly from the motor and around said shaft to journal the lower end of the shaft, and to surround said tubular member with a sleeve rotative with the shaft and journaling the shaft on said tubular support, said sleeve furthermore shielding said shaft and bearing from the pumped liquid.

A further object is to provide for relief of pressure in the pump casing when the discharge line of the pump is closed, and to safeguard the journal bearings against the relief flow of liquid.

It is an object of the invention, also, to mount a centrifugal pump on the lower end of a vertical shaft surrounded by a stationary tubular member and to rigidly mount a sleeve on said shaft between the pump and lower end of said tubular member, to journal the lower end of said sleeve on said tubular member, and to enclose said sleeve within a stand pipe rising from the pump casing and providing for an upward relief flow of liquid from the casing when the normal discharge conduit of the pump is closed.

These and various other objects the invention attains by the construction hereinafter described and illustrated in the accompanying drawing, wherein:

Fig. 1 is a view in vertical sectional elevation of the improved pump and its drive mechanism.

Fig. 2 is a cross-sectional view of the pump taken upon the line 2—2 of Fig. 1.

Fig. 3 is a cross section upon the line 3—3 of Fig. 1.

In these views, the reference character 1 designates an ordinary centrifugal pump impeller and 2 the pump casing. Said pump, as illustrated, is completely immersed in the liquid to be delivered, but such immersion is not an essential. The casing 2 has a central inlet 3 in its bottom and is tangently formed with an outlet 4 from which a delivery pipe 5 leads to any desired point.

The impeller 1 is fast on the lower end of a vertical drive shaft 6 of a length adequate to permit an electric motor 7, engaging the upper end of said shaft, to be disposed well above the liquid level. The drive connection from the shaft 8 of said motor to the shaft 6 is established through any suitable coupling 9.

The motor 7 seats upon a bracket 10, which rigidly carries a fitting 11 projecting below said bracket to support certain members surrounding said shaft, the upper portion of which fitting may be chambered as indicated at 13 to accommodate the coupling 9. It is preferred to form said bracket with a depending collar 12, in which the fitting 11 has a pressed fit.

Rigidly secured in the fitting 11 as by a set screw 14 is the upper end of a tubular member 15, which surrounds the shaft 6 with a slight clearance therefrom, terminating at its lower end a short distance above the impeller 1. Below said tubular member and above the impeller, there is fast upon the shaft 6 a collar 16, which carries a sleeve 17 rising coaxially with said shaft and outwardly spaced from the member 15 to form a lubricant chamber. Within the lower portion of said chamber and preferably adjacent to the closed bottom 18 thereof an anti-friction bearing 19 journals the sleeve 17 upon the member 15. The upper end portion of the sleeve 17 is journaled within an inverted socket bearing 20, formed by the lower portion of the fitting 11.

Coaxial with the sleeve 17 and outwardly spaced therefrom is a stand pipe 21 which at its lower end opens into the pump casing 2 and is rigidly embraced by a collar 22 upstanding from said casing. As illustrated, the stand pipe is screw-threaded into said collar. The upper end portion of the stand pipe embraces the lower portion of the fitting 11 and is rigidly connected thereto as by the same screw 14 that holds the member 15 rigid with said fitting.

The stand pipe 21 by its engagement with the collar 12 rigidly supports the pump casing 2, and the passage formed between said pipe and the sleeve 17 provides for an upward discharge of liquid from the casing 2, when the normal outflow from said casing through the conduit 5 is for any reason cut off. Thus, at a point above the normal liquid level, there is formed in said stand pipe one or more outlets 23 through which liquid rising within the stand pipe may discharge.

It is important to prevent any access of such liquid to the socket bearing 20, as this would not only act detrimentally upon said bearing and the sleeve 17, but would admit the liquid to the lubricant chamber within said sleeve and to the bearing 19 in the lower portion of said sleeve. While the openings 23 are adequately proportioned to ordinarily prevent any rise of liquid into the socket 20, it is preferred as an additional safeguard to mount on the sleeve 17 below said socket and above the outlets 23 a baffle ring 24 to obstruct upward flow of water on the outer face of said sleeve. Said ring preferably has its outer face formed with reverse bevels intersecting to form an annular edge from which any moisture will be centrifugally thrown out when the pump is in operation. The stand pipe is preferably formed with an annular enlargement 25 at the level of the ring 24 to receive any centrifugal discharge from said ring, said enlargement having openings 26 in its bottom wall for the escape of such liquid.

The described pump requires very little care and attention as compared to one having replaceable packings, and the journals arranged as described are very adequately protected against the pumped liquid. The sleeve 17 has a large storage capacity for lubricant, and employment of the stand pipe 21 as a support for the casing of the pump simplifies the construction and reduces its cost.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In a device of the character described, the combination with a centrifugal pump comprising an impeller and its casing, of a drive shaft carrying said impeller, a stationary tubular member surrounding said shaft, a sleeve spaced from and surrounding said tubular member and secured to said shaft between the impeller and tubular member, a rigid support for said tubular member journaling the upper end of said sleeve, and a bearing between the lower portion of said tubular member and said sleeve.

2. A pump and drive shaft assembly comprising a substantially vertical shaft, an impeller on the lower portion of said shaft, a casing for said impeller, a sleeve coaxial with said shaft forming a lubricant chamber, means rigidly mounting said sleeve on said shaft, a fitting journaling the upper end of said sleeve, a stand pipe carried by said fitting coaxially with said shaft, surrounding said sleeve and carrying and communicating with said casing, said stand pipe having an outlet in its upper portion, and a bearing journaling the lower portion of said sleeve and receiving lubricant from said chamber.

3. In a pump and drive shaft assembly, a vertical shaft, a pump impeller fast on said shaft, a pump casing enclosing said impeller, a stationary tubular member surrounding said shaft, a sleeve surrounding and spaced from said tubular member, means rigidly mounting said sleeve upon said shaft between said tubular member and the impeller, and a common support for said tubular member and the pump casing, journaling the upper end portion of said sleeve.

4. In a pump and drive shaft assembly, the combination with a centrifugal pump comprising an impeller and its casing, of a drive shaft carrying said impeller, a substantially tubular member surrounding said shaft extending at one end adjacent to said impeller, a sleeve spaced from and surrounding said tubular member, means securing said sleeve to said shaft between the impeller and tubular member, means journaling said shaft on the end portion of said tubular member adjacent to said impeller, and a support for the other end portion of said tubular member, journaling said sleeve.

5. A pump and drive shaft assembly comprising a vertical shaft, a pump impeller fast upon the lower end portion of said shaft, a pump casing receiving said impeller, a cylindrical support for the casing surrounding said shaft, a sleeve carried by the shaft and spaced therefrom within said cylindrical support, a member carrying said cylindrical support and journaling said sleeve, a ring exteriorly carried by said sleeve obstructing the upward flow of water thereupon, said support having an annular enlargement in the horizontal plane of said ring formed with an outlet in its outer portion.

6. In a device of the character described, the combination with a centrifugal pump comprising an impeller and its casing, of a substantially vertical drive shaft, the lower end of which carries said impeller, a sleeve coaxial with said shaft and spaced therefrom, means securing the lower end of said sleeve upon said shaft adjacent to said impeller, a member journaling the upper end of said sleeve, and means supporting the pump casing upon said member.

In testimony whereof I sign this specification.

HOWARD T. BROWN.